Aug. 22, 1944. P. MARTIN 2,356,258
MOTOR VEHICLE BRAKE
Filed July 22, 1942
Fig.1
Fig.2
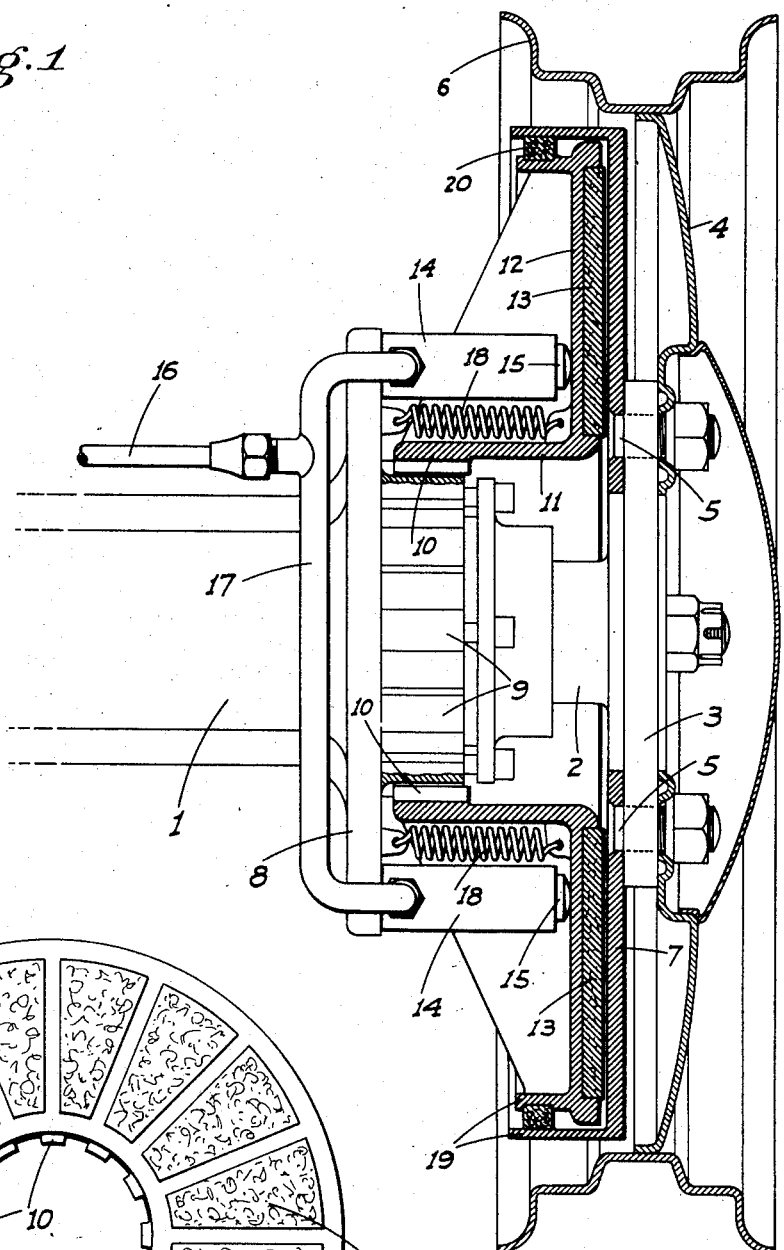
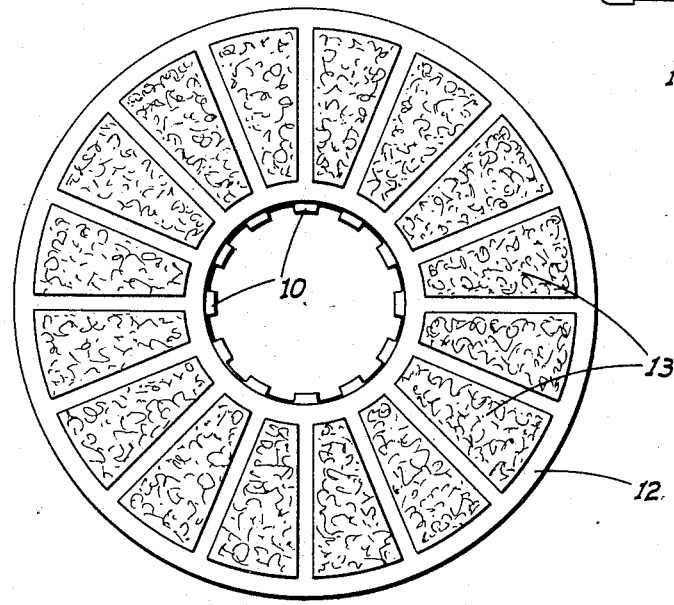
INVENTOR
Philip Martin
BY
ATTYS Patented Aug. 22, 1944

2,356,258

UNITED STATES PATENT OFFICE 2,356,258

MOTOR VEHICLE BRAKE

Philip Martin, Victorville, Calif.

Application July 22, 1942, Serial No. 451,817

1 Claim. (Cl. 188—71)

This invention relates to brakes for motor vehicle wheels, my principal objects being to provide a hydraulic brake for the purpose which has great braking area for a given size, which requires no adjustment for wear or any take-up to give an even braking action, and which is far simpler and cheaper to manufacture and assemble than the ordinary hydraulic brake unit now used for the purpose.

These objects I accomplish by means of such structure and relative arrangement of parts as will fully appear by a perusal of the following specification and claim.

In the drawing similar characters of reference indicate corresponding parts in the several views:

Figure 1 is a sectional elevation of my improved brake structure as mounted in connection with the rear wheel of an automobile.

Figure 2 is a face view of the movable brake disc.

Referring now more particularly to the characters of reference on the drawing, a conventional rear wheel assembly includes, with the rear axle housing 1, a wheel hub 2 projecting from the housing and having a radially extending flange 3 on the forward face of which the wheel 4 is mounted by flange supported studs 5 in the usual manner. The wheel has a tire engaging rim 6 fixed in connection therewith and overhanging the hub in a laterally inward direction.

My improved brake unit, which may be mounted in connection with the above standard arrangement of parts, comprises a smooth faced brake disc 7 secured against the back or laterally inward side of the flange 3 by the studs 5, for rotation with the wheel. This disc is of case hardened steel.

The adjacent end portion of the housing 1, laterally out from the radial flange 8 thereon which usually carries the supporting plate of the ordinary brake mechanism, is provided with longitudinal splines 9, which cooperate with internal splines 10 formed on the hub 11 of the cooperating, relatively stationary brake disc 12 which faces the disc 7. These discs may be of such size that they will just fit within the overhanging rim 6 so as to give the maximum braking area. Recessed into the laterally outermost face of the disc 12 in closely spaced relation thereabout are segments 13 of brake lining or friction material which project somewhat from said face.

Mounted on the flange 8 are diametrally opposed hydraulic cylinders 14, extending from the flange parallel to the axis of the wheel toward the disc 12, and having plungers 15 projecting therefrom and engaging the back side of said disc. As shown, the outer ends of plungers 15 are rounded and engage disc 12 in free relation; the advantage of this arrangement being that cylinders 14 need not be in exact parallel relationship to each other and to the spline assembly 9—10, which facilitates manufacture and maintenance. Fluid is fed evenly to both cylinders from a supply pipe 16 by means of a branching conduit 17 leading from said pipe to both cylinders. Tension springs 18 connect the disc 12 and flange 8 and normally hold said disc clear of the disc 7 when the fluid is relieved from the cylinders.

In order to prevent dirt, etc., from getting between the discs, I may provide both discs with annular, concentric and spaced flanges 19 about their periphery, between which is seated a sealing ring 20 of suitable material, said ring being of course rotatable relative to one flange.

Since the brake lining segments 13 are recessed into the disc 12, they are fixed in driving relation therewith; and inasmuch as the segments are always relatively close to the disc 7 even when the brake is released, they can never drop out, even though they may have a somewhat loose fit in the disc 12. No additional securing means for the lining, such as must be employed for the ordinary brake, is therefore needed. They are, however, pressed in, although the conventional rivets may be used if desired. The brake may be relined, or in other words the disc 12 be refitted with new lining segments, by merely pulling the wheel hub from the axle, which exposes said disc and enables the same to be withdrawn.

A brake thus constructed and operated will have considerably greater braking or holding power than an ordinary disc clutch of corresponding size.

While the brake structure has been here shown and described as being particularly for motor vehicle use, it is also readily adaptable for use on the landing wheels of airplanes.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

A motor vehicle wheel brake unit comprising, with a radial wheel-hub flange and a fixed member from which the hub turnably projects, a brake disc fixed on said flange concentric with the hub, the adjacent end portion of said member having splines, a cooperating disc slidably mounted on said splines, hydraulic cylinders arranged in circumferentially spaced relation about the cooperating disc and projecting back from said disc parallel to the axis thereof, an element on said member beyond the splined portion thereof and from which the cylinders are supported at their laterally inward end, and plungers projecting from the opposite end of the cylinders and engaging the back of the cooperating disc; said plungers being rounded on their outer ends, and said ends engaging said cooperating disc in free relation.

PHILIP MARTIN.